United States Patent
Kim

(10) Patent No.: US 11,630,199 B2
(45) Date of Patent: Apr. 18, 2023

(54) SENSOR INFORMATION FUSION DEVICE AND METHOD THEREOF

(71) Applicants: HYUNDAI MOTOR COMPANY, Seoul (KR); KIA MOTORS CORPORATION, Seoul (KR)

(72) Inventor: Seong Hwan Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 265 days.

(21) Appl. No.: 17/085,713

(22) Filed: Oct. 30, 2020

(65) Prior Publication Data

US 2022/0018951 A1   Jan. 20, 2022

(30) Foreign Application Priority Data

Jul. 16, 2020   (KR) .................. 10-2020-0088352

(51) Int. Cl.
| | | |
|---|---|---|
| G01S 13/86 | (2006.01) | |
| G01S 13/89 | (2006.01) | |
| G06F 18/25 | (2023.01) | |
| G01S 13/931 | (2020.01) | |

(52) U.S. Cl.
CPC ............ *G01S 13/867* (2013.01); *G01S 13/89* (2013.01); *G06F 18/25* (2023.01); *G01S 13/931* (2013.01); *G01S 2013/9321* (2013.01)

(58) Field of Classification Search
CPC ...... G01S 13/867; G01S 13/89; G06K 9/6288
See application file for complete search history.

(56) References Cited

U.S. PATENT DOCUMENTS 11,423,570 B2 *  8/2022  Kavulya .................. G06T 7/73

* cited by examiner

*Primary Examiner* — Bryan Bui
(74) *Attorney, Agent, or Firm* — Morgan, Lewis & Bockius LLP

(57) ABSTRACT

A sensor information fusion device and a method thereof are provided. The sensor information fusion device includes a processor that generates a first track box and a second track box based on an object detected by a plurality of sensors and determines whether the first track box and the second track box are overlapped with each other and a storage storing data obtained by the processor and an algorithm run by the processor. The processor generates a merge gate expanded from the first track box and determines the first track box and the second track box are overlapped with each other when the second track box is included in the merge gate.

20 Claims, 15 Drawing Sheets

SENSOR INFORMATION FUSION DEVICE AND METHOD THEREOF

CROSS-REFERENCE TO RELATED APPLICATION

This application claims the benefit of and priority to Korean Patent Application No. 10-2020-0088352, filed on Jul. 16, 2020, the entire contents of which are incorporated herein by reference.

TECHNICAL FIELD

The present disclosure relates to a sensor information fusion device and a method thereof, and more particularly, relates to technologies of accurately determining whether a plurality of sensor information are overlapped with each other.

BACKGROUND

To implement smart cars of which humankind has dreamed, accurate positioning of the vehicle, a precise positioning technology, a digital map technology, an advanced driving assistant system (ADAS) for checking a driving state of the driver, and sensors and a sensor fusion technology used for the ADAS are very important.

The sensor fusion among them is a technology of recognizing situations around a host vehicle with high reliability through information fusion based on sensor signals output from a front radar, a front view camera, a corner radar, and the like loaded into the host vehicle. Such a sensor fusion technology of the front radar and the front view camera is applied to the ADAS, such as a smart cruise control (SCC) or a forward collision-avoidance assist (FCA), to be mass-produced.

Because information output by such sensors includes an overlapped portion, such an overlapped portion should be determined and deleted to fuse the information.

A method for obtaining a segment formula of a box capable of determining more various overlapped situations and determining whether there is an intersection between segments of two boxes has a high successful rate for determining whether the two boxes are overlapped with each other. However, because the method needs the process of obtaining four points of a track box, obtaining a four-segment formula, and identifying whether there is an intersection between segments, a process for determining an overlapped situation is very complicated.

SUMMARY

An aspect of the present disclosure provides a sensor information fusion device for simply and accurately determining whether several tracks are overlapped with each other to fuse the tracks when one object is detected as the several overlapped tracks by a plurality of sensors and a method therefor.

The technical problems to be solved by the inventive concept are not limited to the aforementioned problems, and any other technical problems not mentioned herein will be clearly understood from the following description by those skilled in the art to which the present disclosure pertains.

According to an aspect of the present disclosure, a sensor information fusion device may include a processor that generates a first track box and a second track box based on an object detected by a plurality of sensors and determine whether the first track box and the second track box are overlapped with each other and a storage storing data obtained by the processor and an algorithm run by the processor. The processor may generate a merge gate expanded from the first track box and determine that the first track box and the second track box are overlapped with each other when the second track box is included in the merge gate.

In an embodiment, the processor may calculate midpoints of the first track box and the second track box based on information received from the plurality of sensors.

In an embodiment, the processor may convert the midpoint of the first track box into the origin and may calculate coordinates of vertices of the first track box based on length information and width information of the first track box.

In an embodiment, the processor may convert the midpoint of the second track box as relative coordinates for the origin of the first track box by applying the midpoint of the first track box and the midpoint of the second track box to a rotation transformation formula.

In an embodiment, the processor may determine a size of the merge gate based on length information and width information of the first track box.

In an embodiment, the processor may calculate coordinates of vertices of the second track box using the midpoint, length information, width information, and a heading value of the second track box.

In an embodiment, the processor may determine whether the first track box and the second track box are overlapped with each other based on a box-in point function and may determine whether the first track box and the second track box are overlapped with each other by applying a box crossed function to targets which are not determined by the box-in point function.

In an embodiment, the processor may determine that the first track box and the second track box are overlapped with each other, when at least one of coordinates of vertices of the second track box is located in the first track box.

In an embodiment, the processor may divide a region outside the first track box into a plurality of regions, when all of coordinates of vertices of the second track box are not located in the first track box, and may determine whether the first track box and the second track box are overlapped with each other based on a location of the coordinates, when the coordinates of the vertices of the second track box are located in the plurality of regions.

In an embodiment, the processor may sequentially divide and define a region above the first track box as a first region, a second region, and a third region, may define a region at the left of the first track box as a fourth region and defines a region at the right of the first track box as a fifth region, and may sequentially divide and define a region below the first track box as a sixth region, a seventh region, and an eighth region.

In an embodiment, the processor may determine that the first track box and the second track box are overlapped with each other, when at least one of the coordinates of the vertices of the second track box is present in the second region and the seventh region or is present in the fourth region and the fifth region.

In an embodiment, the processor may form a first triangle by a line extended after a first vertex of the second track box is connected with a first vertex of the first track box, a perpendicular line drawn from the first vertex of the second track box to the first track box, and a portion of a first surface of the first track box and may form a second triangle by a line extended after a second vertex of the second track box is connected with the first vertex of the first track box, a perpendicular line drawn from the second vertex of the second track box to the first track box, and a portion of a second surface of the first track box, when at least one of the coordinates of the vertices of the second track box is not present in the second region and the seventh region and is not present in the fourth region and the fifth region.

In an embodiment, the processor may calculate a tangent value of the first triangle and a tangent value of the second triangle and may compare the tangent value of the first triangle with the tangent value of the second triangle.

In an embodiment, the processor may determine that the first track box and the second track are overlapped with each other, when the tangent value of the first triangle is less than a tangent value of the second triangle.

In an embodiment, the processor may select a track box for fusion depending on reliability of the first track box and reliability of the second track box.

In an embodiment, the processor may perform fusion using a track box with higher reliability, when the reliability of the first track box and the reliability of the second track box have a difference of a predetermined reference value or more.

In an embodiment, the processor may select a track box, a generation time of which is old, when the reliability of the first track box and the reliability of the second track box have a difference of less than a predetermined reference value.

In an embodiment, the processor may calculate the reliability of the first track box and the reliability of the second track box using reliability of each of sensors which provide information to generate the first track box and the second track box and a time when the first track box and the second track box are generated.

In an embodiment, the processor may delete a track box which is not selected for fusion.

According to another aspect of the present disclosure, a sensor information fusion method may include generating a first track box and a second track box based on an object detected by a plurality of sensors, generating a merge gate expanded from the first track box and determining that the first track box and the second track box are overlapped with each other, when the second track box is included in the merge gate, and deleting the first and second track boxes which are overlapped with each other to perform fusion.

DRAWINGS

In order that the disclosure may be well understood, there will now be described various forms thereof, given by way of example, reference being made to the accompanying drawings, in which:

FIGS. 1A, 1B, and 1C are drawings illustrating a conventional manner for distinguishing overlapped track boxes;

Figure 9:
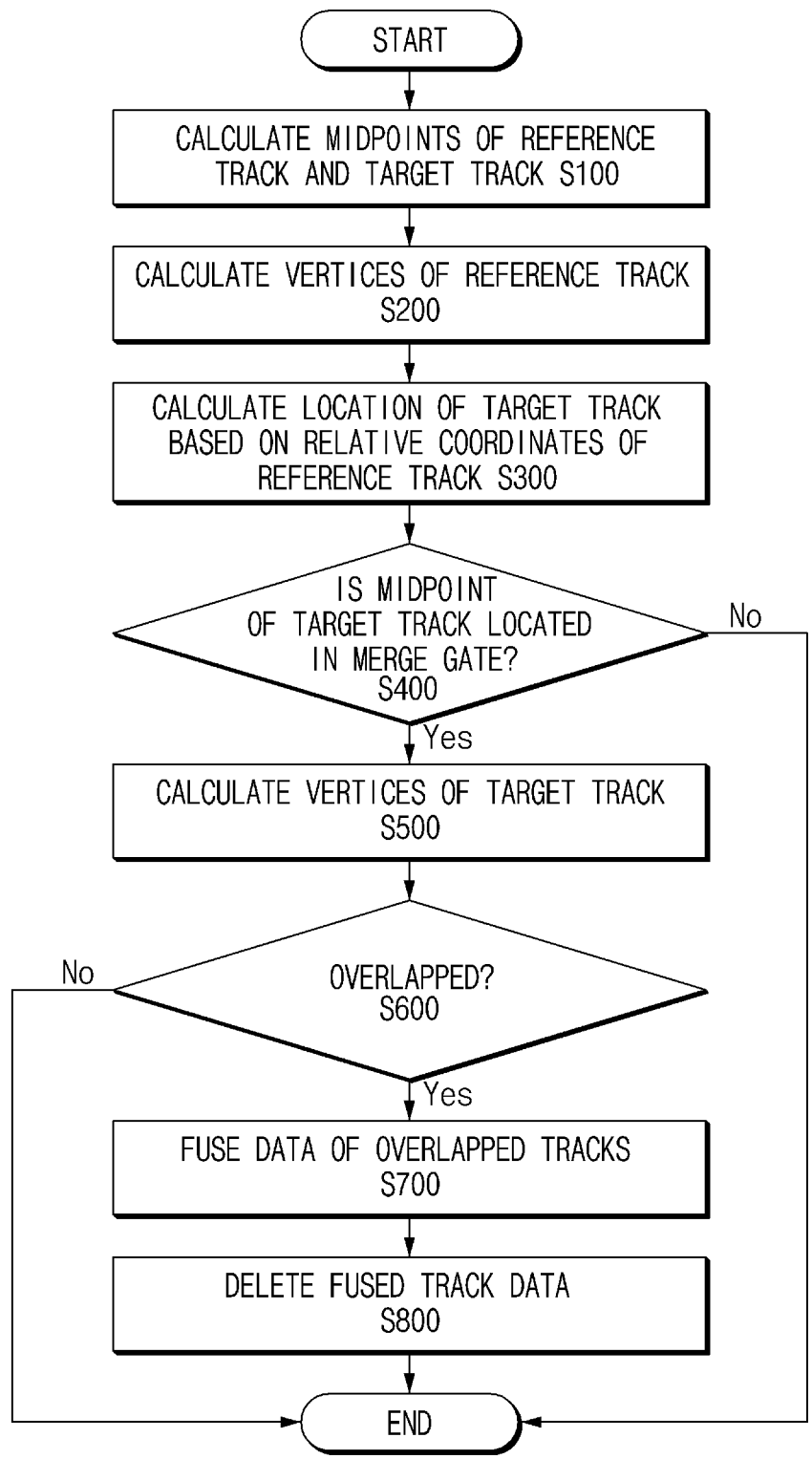
Figure 10:
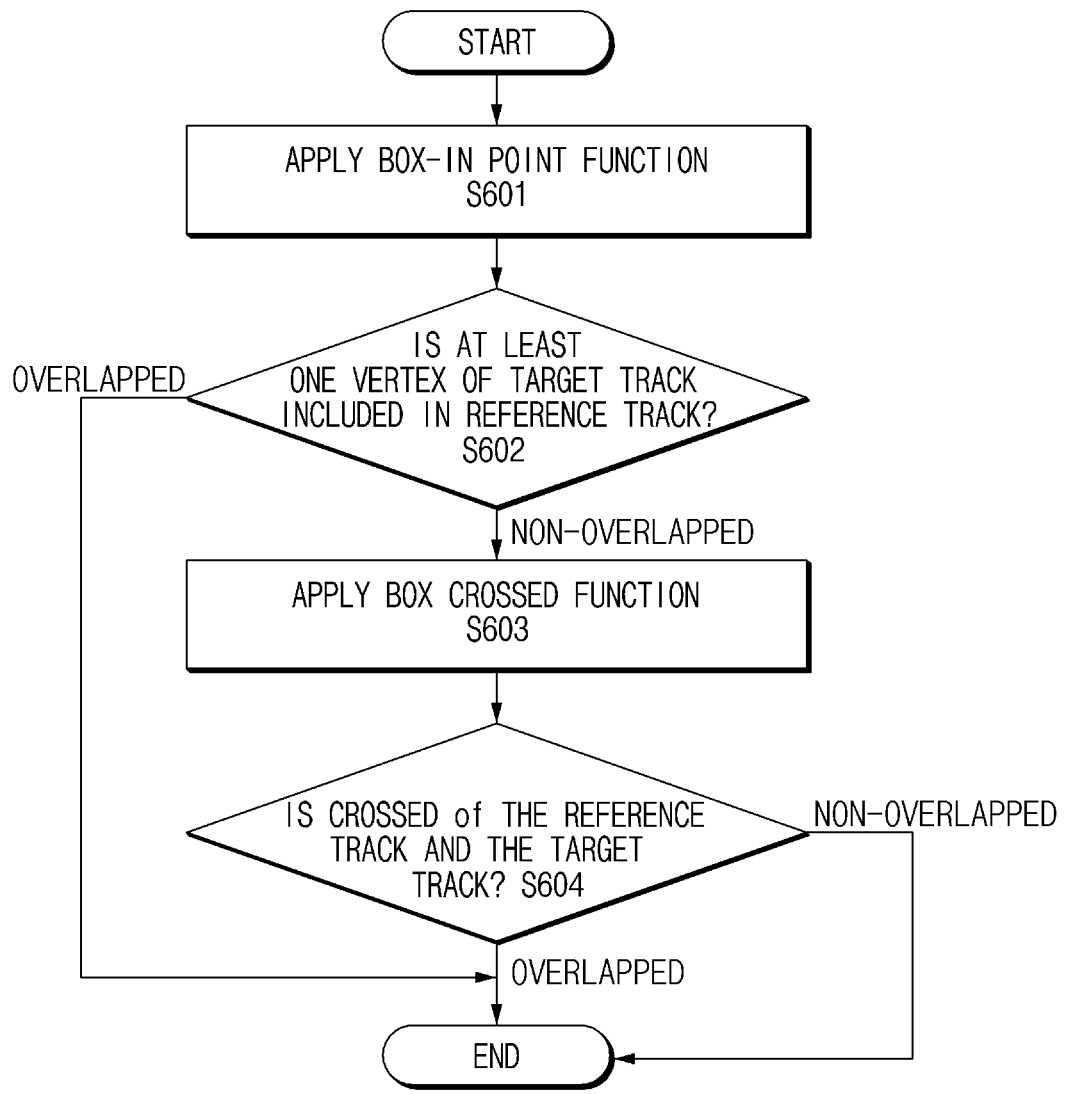
Figure 11:
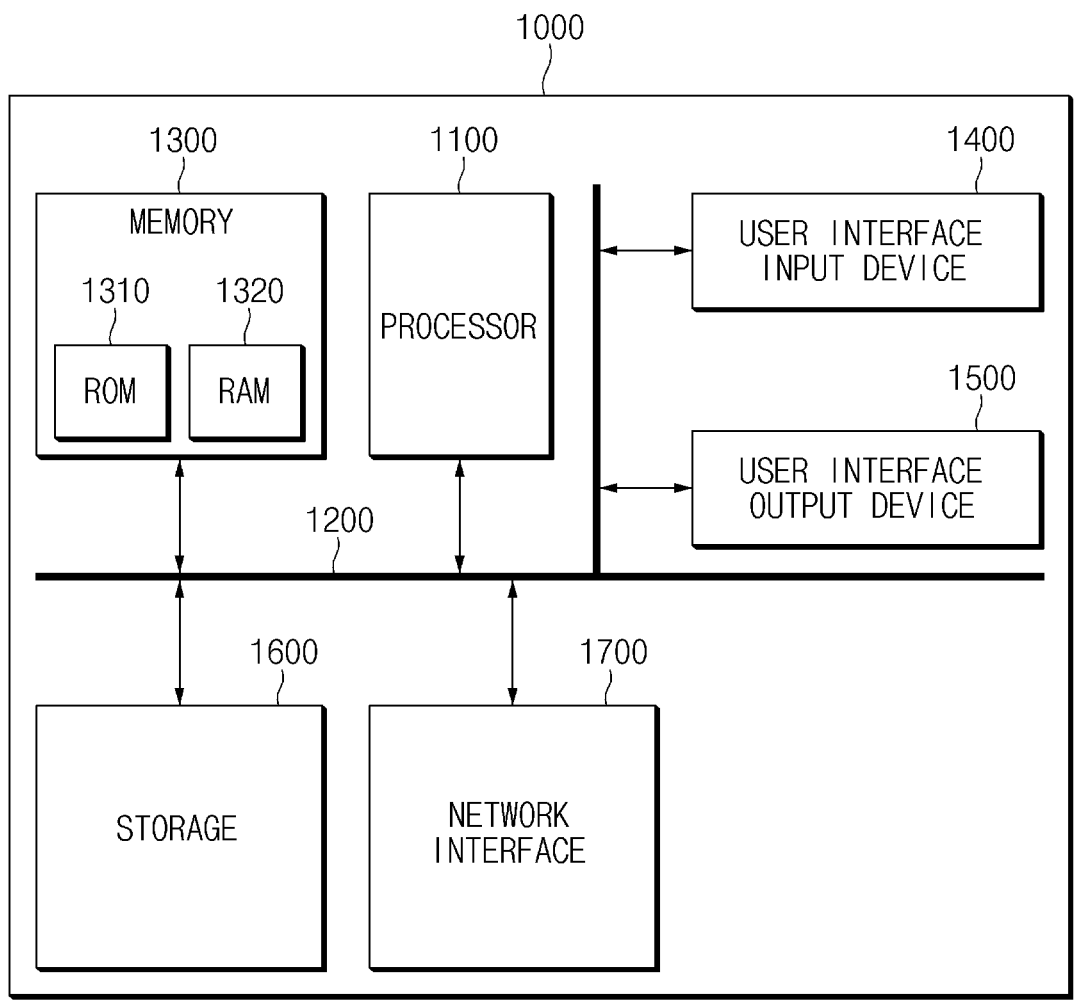

FIGS. 8A, 8B, 8C, and 8D are drawings illustrating exemplary screens of applying a box crossed function in one form of the present disclosure;

FIG. 9 is a flowchart illustrating a sensor information fusion method in one form of the present disclosure;

FIG. 10 is a flowchart illustrating in detail a method for determining whether a reference track and a target track are overlapped with each other in one form of the present disclosure; and FIG. 11 is a block diagram illustrating a computing system in one form of the present disclosure.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1A:
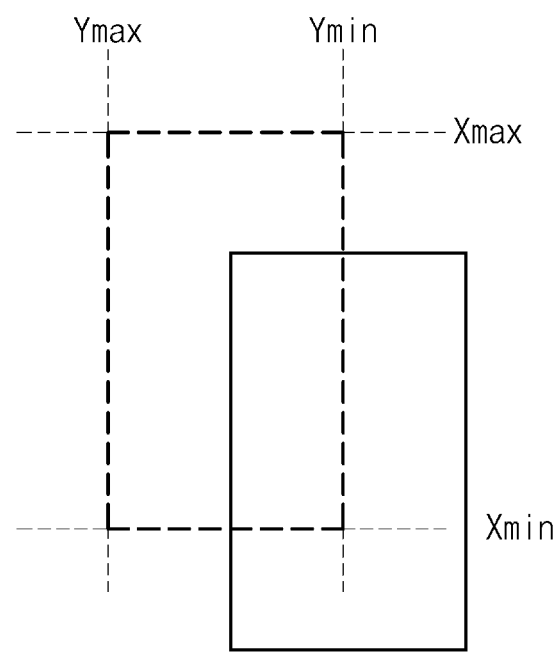
Figure 1B:
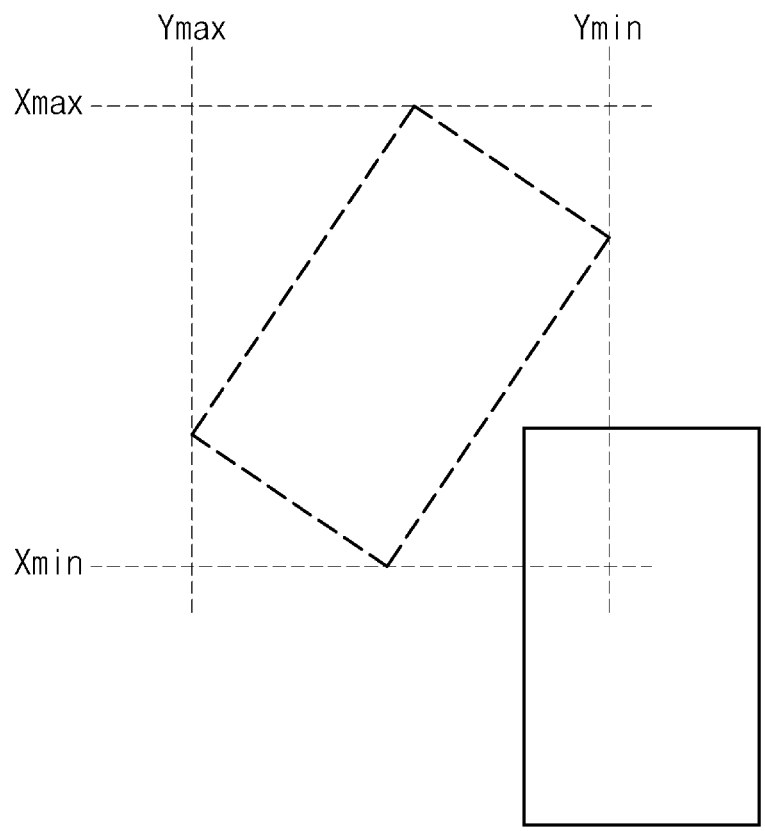
Figure 1C:
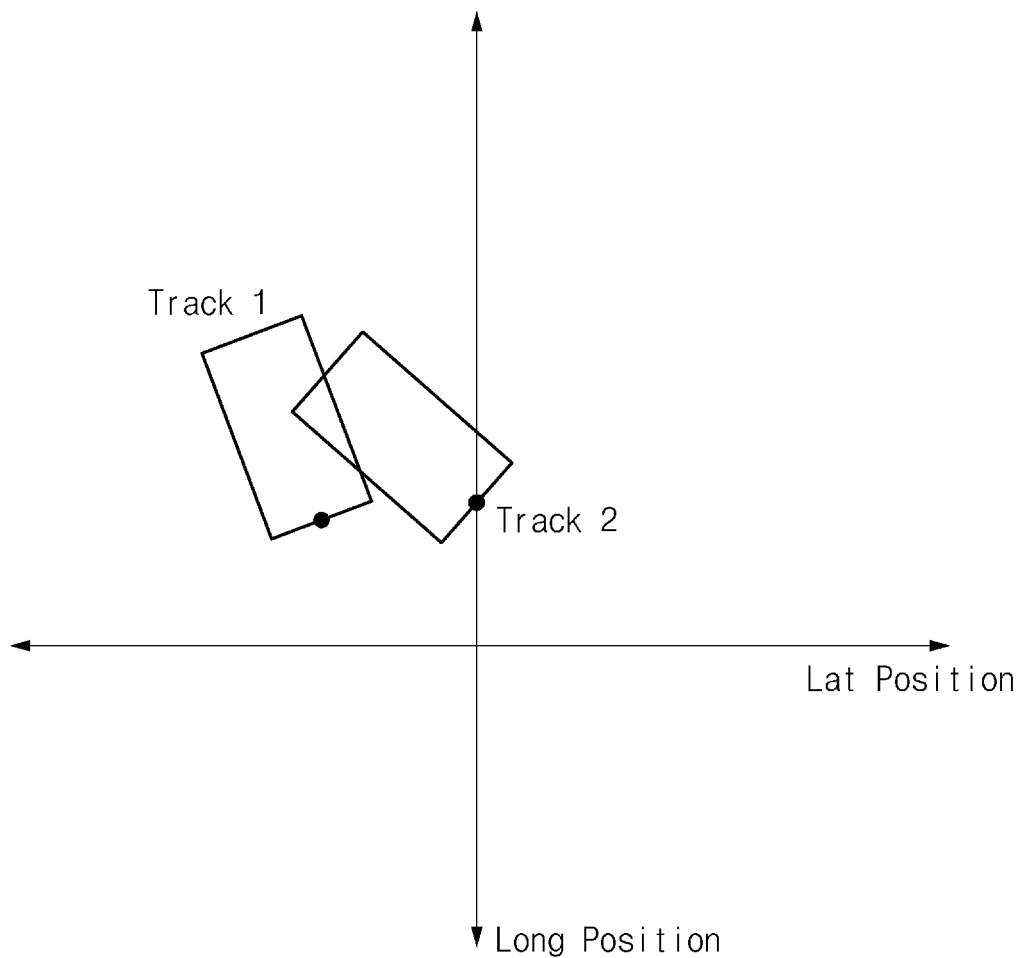

In an existing technology, to distinguish track boxes overlapped when fusing sensors, a minimum (Min)/maximum (Max) manner is used as shown in FIG. 1A or a manner of calculating an intersection of track boxes is used as shown in FIG. 1C.

As shown in FIG. 1B, the Min/Max manner is applicable only when two boxes are in a horizontal form. When directions of the two boxes differ from each other, there may occur an error determination of whether the two boxes are overlapped with each other and all overlapped situations are not determined.

Hereinafter, embodiments of the present disclosure will be described in detail with reference to FIGS. 2 to 11.

Figure 2:
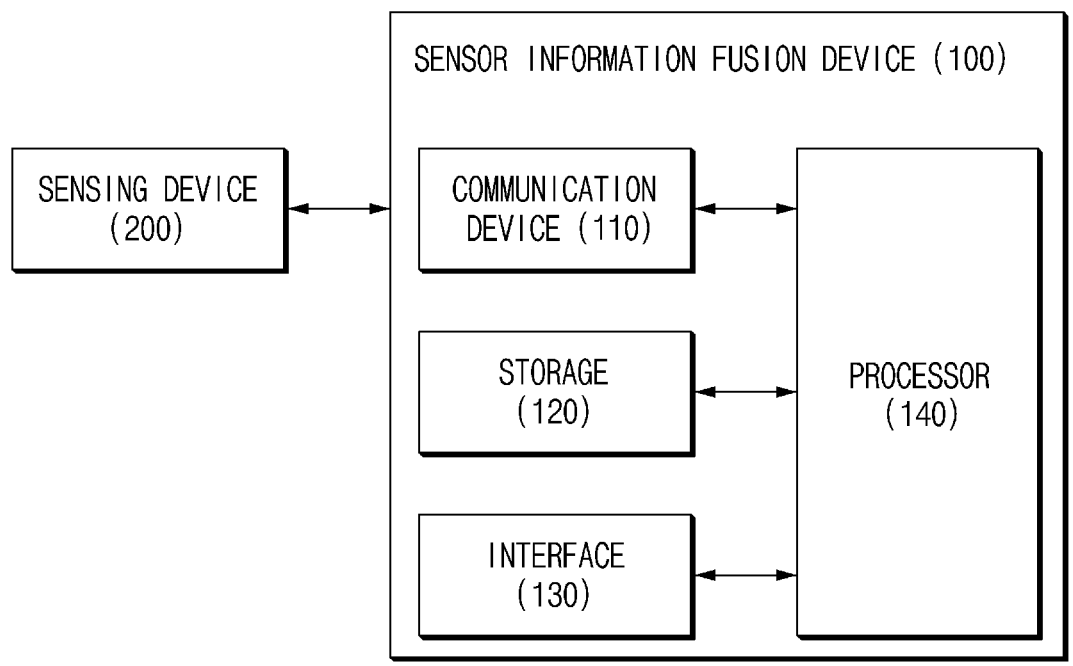
FIG. 2 is a block diagram illustrating a configuration of a vehicle system including a sensor information fusion device in one form of the present disclosure.

FIG. 2 is a block diagram illustrating a configuration of a vehicle system including a sensor information fusion device according to an embodiment of the present disclosure.

A sensor information fusion device 100 according to an embodiment of the present disclosure may be implemented in a vehicle. In this case, the sensor information fusion device 100 may be integrally configured with control units in the vehicle or may be implemented as a separate device to be connected with the control units of the vehicle by a separate connection means.

Referring to FIG. 2, the vehicle system may include the sensor information fusion device 100 and a sensing device 200.

The sensor information fusion device 100 may generate a first track box (a reference track) and a second track box (a target track) based on an object detected by a plurality of sensors and may determine whether the first track box and the second track box are overlapped with each other. Particularly, the sensor information fusion device 100 may generate a merge gate expanded from the first track box and may determine that the first track box and the second track box are overlapped with each other when the second track box is included in the merge gate.

For example, the sensor information fusion device 100 may receive sensor information respectively sensed by sensor A, sensor B, sensor C, and sensor D, may generate the reference track based on information received from sensor A and sensor B, and may generate the target track based on information received from sensor C and sensor D.

In this case, the reference track and the target track may be information about one overlapped object, but may be differently recognized according to sensors. Thus, the sensor information fusion device 100 according to an embodiment of the present disclosure may detect and delete such overlapped information to fuse sensor information.

The sensor information fusion device 100 according to an embodiment of the present disclosure, which performs the above-mentioned operations, may be implemented in the form of independent hardware including a memory and a processor for processing each operation or may be driven in the form of being included in another hardware device such as a microprocessor or a universal computer system.

To this end, the sensor information fusion device 100 may include a communication device 110, a storage 120, an interface 130, and a processor 140.

The communication device 110 may be a hardware device implemented with various electronic circuits to transmit and receive a signal through a wireless or wired connection. In an embodiment of the present disclosure, the communication device 110 may perform a network communication technology in the vehicle and may perform vehicle-to-infrastructure (V2I) communication with a server, an infrastructure, or another vehicle outside the vehicle using wireless Internet technology or short range communication technology. Herein, the network communication technology in the vehicle may be to perform inter-vehicle communication through controller area network (CAN) communication, local interconnect network (LIN) communication, flex-ray communication, or the like. Furthermore, the wireless Internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 110 may receive results sensed by sensors in the sensing device 200.

The storage 120 may store a sensing result of the sensing device 200, data obtained by the processor 140, or data, algorithms, and/or the like necessary for an operation of processor 140.

As an example, the storage 120 may store forward sensing information or the like obtained by a camera, a light detection and ranging (LiDAR), a radar, or the like and may store a value preset by an experimental value to determine a size of a merge gate.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The interface 130 may include an input means for receiving a control command from a user and an output means for outputting an operation state, an operation result, or the like of the sensor information fusion device 100. Herein, the input means may include a key button and may further include a mouse, a joystick, a jog shuttle, a stylus pen, or the like. Furthermore, the input means may further include a soft key implemented on a display.

The output means may include the display and a voice output means such as a speaker. In this case, when a touch sensor such as a touch film, a touch sheet, or a touch pad is provided in the display, the display operates as a touchscreen and may be implemented in a form where the input means and the output means are integrated with each other. As an example, the output means may output information sensed by the sensing device 200 or may output sensor information fused by the sensor information fusion device 100.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The processor 140 may be electrically connected with the communication device 110, the storage 120, the interface 130, or the like and may electrically control the respective components. The processor 140 may be an electrical circuit which executes instructions of software and may perform a variety of data processing and calculation described below. The processor 140 may be, for example, an electronic control unit (ECU), a micro controller unit (MCU), or another sub-controller, which is loaded into the vehicle.

The processor 140 may generate the reference track (the first track box) and the target track (the second track box) for an object using sensing results received from a plurality of sensors.

Figure 3:
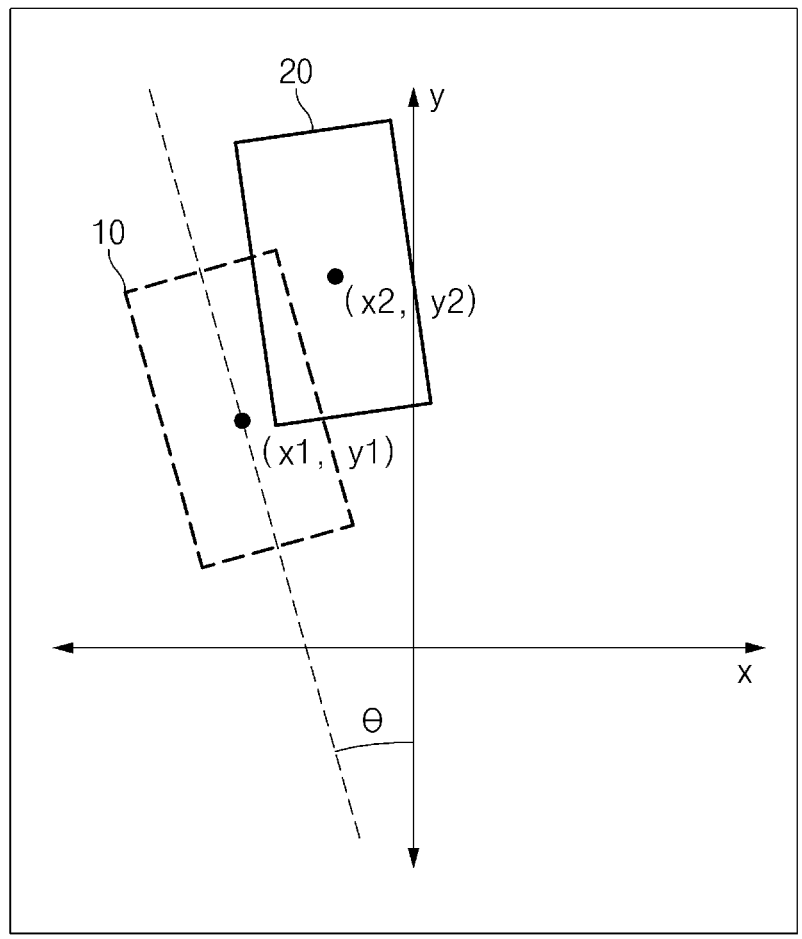
FIG. 3 is a drawing illustrating an exemplary screen of converting midpoints of two track boxes in one form of the present disclosure.

The processor 140 may calculate midpoints of the reference track and the target track based on information received from the plurality of sensors. Referring to FIG. 3, the processor 140 may generate track boxes 10 and 20 for a detected object based on information about the object detected by the plurality of sensors. In this case, as shown in FIG. 3, a track box for one object may be generated differently for each sensor. FIG. 3 is a drawing illustrating an exemplary screen of converting midpoints of two track boxes according to an embodiment of the present disclosure.

A processor 140 of FIG. 2 may generate midpoints (x1, y1) and (x2, y2) of track boxes 10 and 20.

In other words, the processor 140 may receive information about an object detected by the plurality of sensors. The plurality of sensors may provide front midpoint information of the vehicle or rear midpoint information of the vehicle as midpoint information of the detected object. Thus, the processor 140 may unify the front midpoint information of the vehicle or the rear midpoint information of the vehicle into a midpoint of the vehicle to determine whether the track boxes 10 and 20 are overlapped with each other. This is because the accuracy of determining whether track boxes are overlapped with each other may become low when midpoint information of the track box differs from midpoint information of the track box. In this case, the track boxes may be divided into the reference track 10 and the target track 20.

Figure 4:
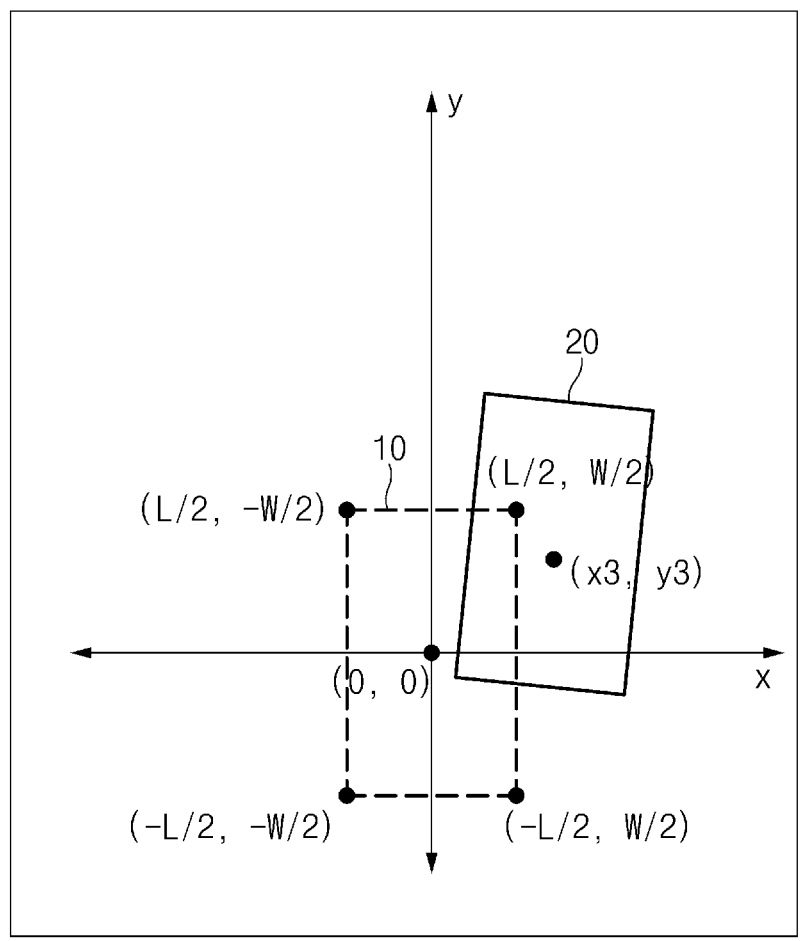
FIG. 4 is a drawing illustrating an exemplary screen of converting a sensor coordinate system into a reference coordinate system in one form of the present disclosure.

The processor 140 may convert a midpoint of the reference track 10 into the origin and may calculate coordinates of vertices of the reference track 10 based on length information and width information of the reference track 10. Referring to FIG. 4, the processor 140 may convert the midpoint of the reference track 10 into the origin (0, 0) and may calculate coordinates of four vertices of the reference track 10 using length information L and width information W of the reference track 10. FIG. 4 is a drawing illustrating an exemplary screen of converting a sensor coordinate system into a reference coordinate system according to an embodiment of the present disclosure. In FIG. 4, coordinates of the left upper vertex are (L/2, −W/2), coordinates of the right upper vertex are (L/2, W/2), coordinates of the left lower vertex are (−L/2, −W/2), and coordinates of the right lower vertex are (−L/2, W/2).

The processor 140 may apply the midpoint (x1, y1) of a reference track 10 and the midpoint (x2, y2) of the target track 20 to a rotation transformation formula in Equation 1 below to calculate the converted midpoint (x3, y3) of the target track 20. In other words, the processor 140 may convert the midpoint (x1, y1) of the reference track 10 into the midpoint (0, 0) and may convert the midpoint (x2, y2) of the target track 20 into the midpoint (x3, y3) depending on the converted midpoint (0, 0) of the reference track 10.

$$x3=(x2-x1)\cos(-\theta)-(y2-y1)\sin(-\theta)$$

$$y3=(x2-x1)\sin(-\theta)+(y2-y1)\cos(-\theta) \quad \text{[Equation 1]}$$

The processor 140 may apply the midpoint of a reference track and the midpoint of a target track to the rotation transformation formula to convert the midpoint of the target track as relative coordinates for the origin of the reference track.

Figure 5:
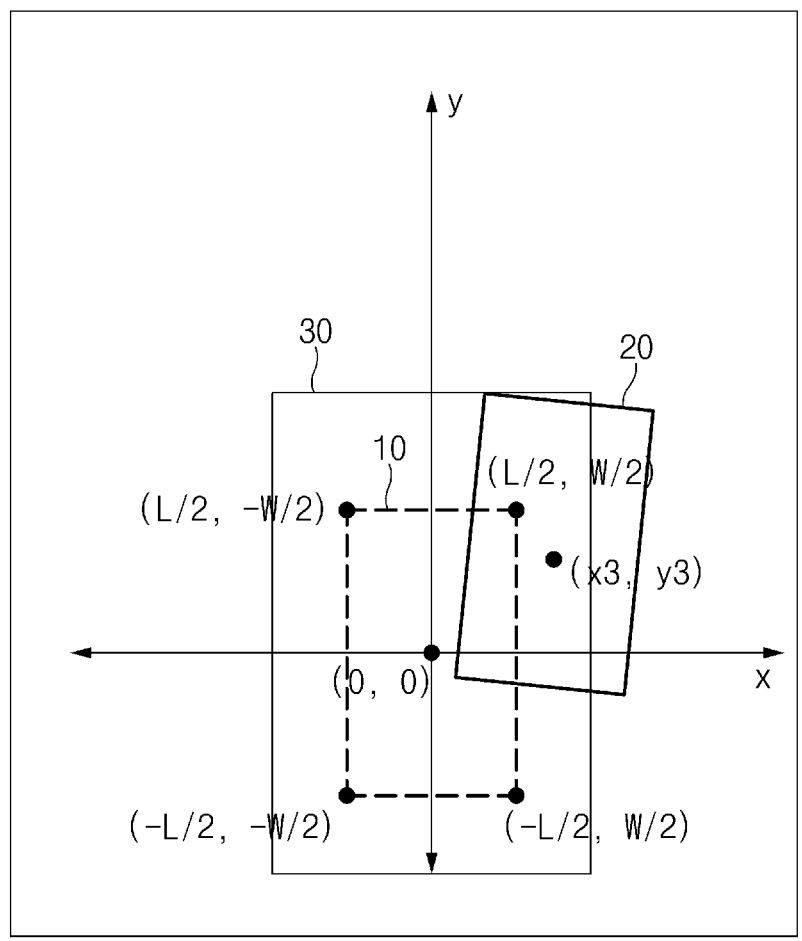
FIG. 5 is a drawing illustrating an exemplary screen of generating a merge gate in one form of the present disclosure.
Figure 6A:
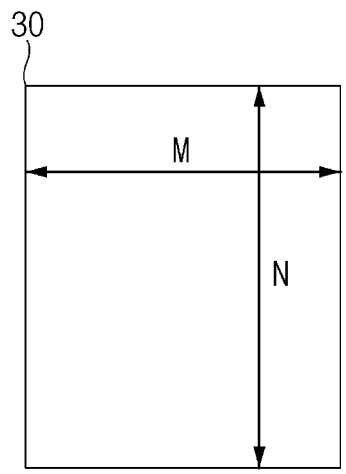
FIGS. 6A and 6B are drawings illustrating exemplary screens of setting a size of a merge gate in one form of the present disclosure.
Figure 6B:
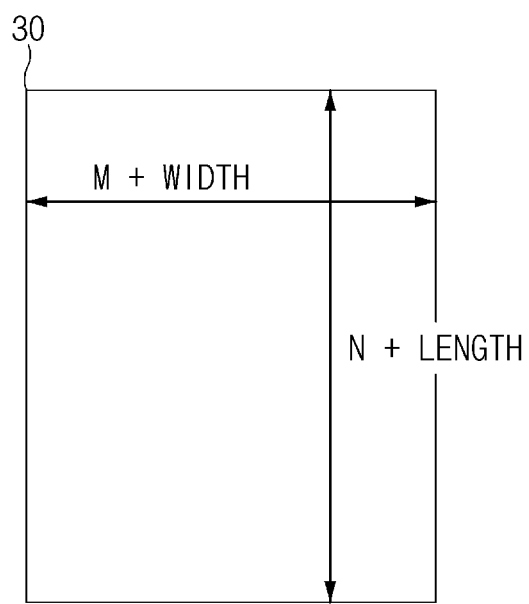

The processor 140 may generate a merge gate expanded from the reference track and may determine that the reference track and the target track are overlapped with each other when the target track is included in the merge gate. Referring to FIG. 5, when converting the midpoint as shown in FIG. 4, the processor 140 may generate a merge gate 30 around the reference track 10. FIG. 5 is a drawing illustrating an exemplary screen of generating a merge gate according to an embodiment of the present disclosure. FIGS. 6A and 6B are drawings illustrating exemplary screens of setting a size of a merge gate according to an embodiment of the present disclosure. A processor 140 of FIG. 2 may set a horizontal length M and a vertical length N of the merge gate, which are preset by an experimental value, as shown in FIG. 6A, or may set a size of the merge gate using a length L and a width W of a reference track 10. In other words, as shown in FIG. 6B, the processor 140 may add the width W and the length L of the reference track 10 to the horizontal length M and the vertical length N of the merge gate, which are set by the experimental value, respectively, to determine a size of the merge gate.

In other words, the processor 140 may increase the length L and the width W of the reference track 10 at a predetermined rate to determine a size of the merge gate.

The processor 140 may calculate coordinates of vertices of a target track 20 using a midpoint, length information, width information, and a heading value of the target track 20.

The processor 140 may determine whether the reference track 10 and the target track 20 are overlapped with each other based on a box-in point function and may apply a box crossed function to targets which are determined by the box-in point function to determine whether the reference track 10 and the target track 20 are overlapped with each other.

In other words, the processor 140 may primarily determine whether the reference track 10 and the target track 20 are mostly overlapped with each other using the box-in point function which needs a little calculation to minimize unnecessary calculation. When at least one of coordinates of vertices of the target track 20 is located in the reference track 10, the processor 140 may determine that the reference track 10 and the target track 20 are overlapped with each other.

Figure 7A:
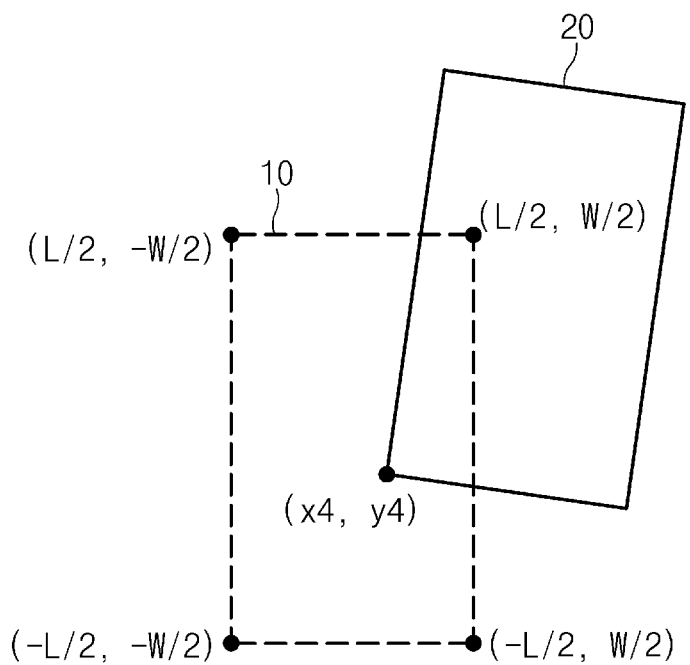
FIGS. 7A and 7B are drawings illustrating exemplary screens of applying a box-in point function in one form of the present disclosure.
Figure 7B:
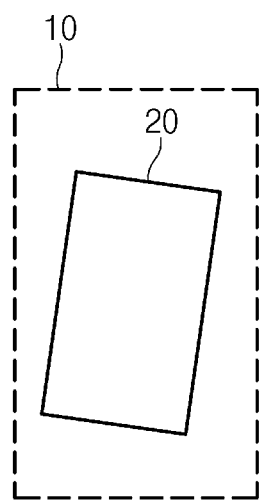

FIGS. 7A and 7B are drawings illustrating exemplary screens of applying a box-in point function to determine whether a reference track and a target track are overlapped with each other according to an embodiment of the present disclosure.

When it is determined that at least one of vertices of a target track 20 is included in a reference track 10 using coordinates of four vertices of the reference track 10 and coordinates of four vertices of the target track 20, a processor 140 of FIG. 2 may determine that the reference track 10 and the target track 20 are overlapped with each other.

The processor 140 may determine whether at least one of the vertices of the target track 20 is included in the reference track 10 using Equation 2 below.

$$(-L/2 < x4 < L/2) \&\& (-W/2 < y5 < W/2) \quad \text{[Equation 2]}$$

FIG. 7A illustrates an example where one vertex of the target track 20 is located in the reference track 10. The processor 140 may determine Equation 2 above to determine whether coordinates (x4, y4) of one vertex of the target track 20 is present in the reference track 10.

In other words, the processor 140 may determine whether an x-axis coordinate x4 is present in an x-axis length of the reference track 10 and may determine whether a y-axis coordinate y4 is present in a y-axis length of the reference track 10, thus determining the coordinates (x4, y4) of one vertex of the target track 20 are present in the reference track 10. Meanwhile, FIG. 7B illustrates an example where all of four vertices of the target track 20 are located in the reference track 10.

The processor 140 may secondarily apply a box crossed function to targets which are not determined using a box-in point function to additionally determine whether the reference track 10 and the target track 20 are overlapped with each other. As such, the processor 140 may filter targets to be overlapped, once more by determining a location of a point of the track box.

In other words, when all of coordinates of vertices of the target track 20 are not located in the reference track 10, the processor 140 may divide a region outside the reference track into a plurality of regions. When the coordinates of the vertices of the target track 20 are located in the plurality of regions, the processor 140 may determine whether the reference track 10 and the target track 20 are overlapped with each other, depending on the location of the coordinates.

The processor 140 may sequentially divide and define a region above the reference track 10 as a first region, a second region, and a third region, may define a region at the left of the reference track 10 as a fourth region, may define a region at the right of the reference track 10 as a fifth region, and may sequentially divide and define a region below the reference track 10 as a sixth region, a seventh region, and an eighth region.

When at least one of coordinates of vertices of the target track 20 is present in the second region and the seventh region or in the fourth region and the fifth region, the processor 140 may determine that the reference track 10 and the target track 20 are overlapped with each other.

A description will be given in detail of an example of applying a box crossed function according to an embodiment of the present disclosure using FIGS. 8A to 8D. FIGS. 8A to 8D are drawings illustrating exemplary screens of applying a box crossed function according to an embodiment of the present disclosure.

Figure 8A:
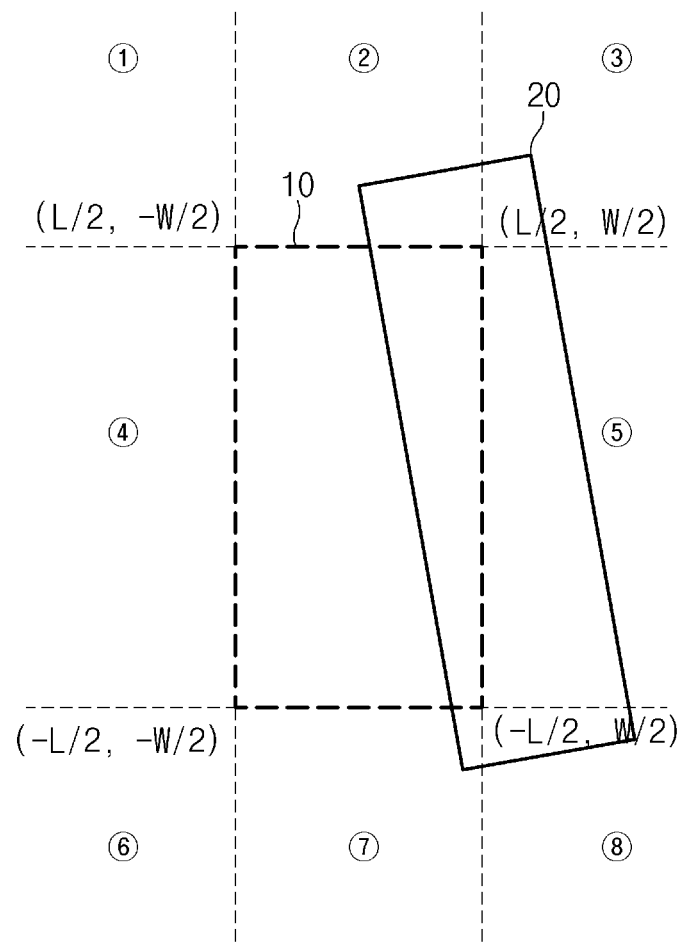

As shown in FIG. 8A, to detect that a target track 20 is overlapped with a reference track 10 although all of four vertices of the target track 20 are not included in the reference track 10, a processor 140 may divide a region outside the reference track 10 into eight regions ①, ②, ③, ④, ⑤, ⑥, ⑦, and ⑧.

The processor 140 may determine whether at least one of coordinates of four vertices of the target track 20 is included in any of the eight regions outside the reference track 10 by comparing coordinates. In FIG. 8A, it may be seen that the left upper vertex of the target track 20 is located in region ②, that the right upper vertex is located in region ③, that the left lower vertex is located in region ⑦, and that the right lower vertex is located in region ⑧. As such, when four vertices of the target track 20 is located in the region outside the reference track 10, the processor 140 may determine that the reference track 10 and the target track 20 are overlapped with each other.

Figure 8B:
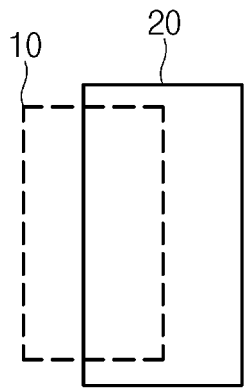
Figure 8C:
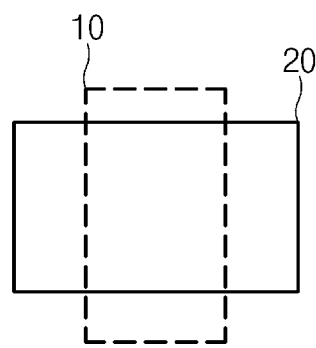

FIG. 8B illustrates the case where four vertices of the target track 20 are located in regions ②, ③, ⑦, and ⑧. FIG. 8C illustrates the case where four vertices of the target track 20 are located in regions ④ and ⑤.

On the other hand, when at least one of coordinates of the vertices of the target track 20 is not present in the second region and the seventh region and is not present in the fourth region and the fifth region, the processor 140 may form a first triangle by a line extended after a first vertex of the target track 20 is connected with a first vertex of the reference track 10, a perpendicular line drawn from the first vertex of the target track 20 to the reference track 10, and a portion of a first surface of the reference track 10, and may form a second triangle by a line extended after a second vertex of the target track 20 is connected with the first vertex of the reference track 10, a perpendicular line drawn from the second vertex of the target track 20 to the reference track 10, and a portion of a second surface of the reference track 10.

The processor 140 may calculate a tangent value of the first triangle and a tangent value of the second triangle to compare the tangent value of the first triangle with the tangent value of the second triangle. When the tangent value of the first triangle is less than the tangent value of the second triangle, the processor 140 may determine that the reference track 10 and the target track 20 are overlapped with each other.

Figure 8D:
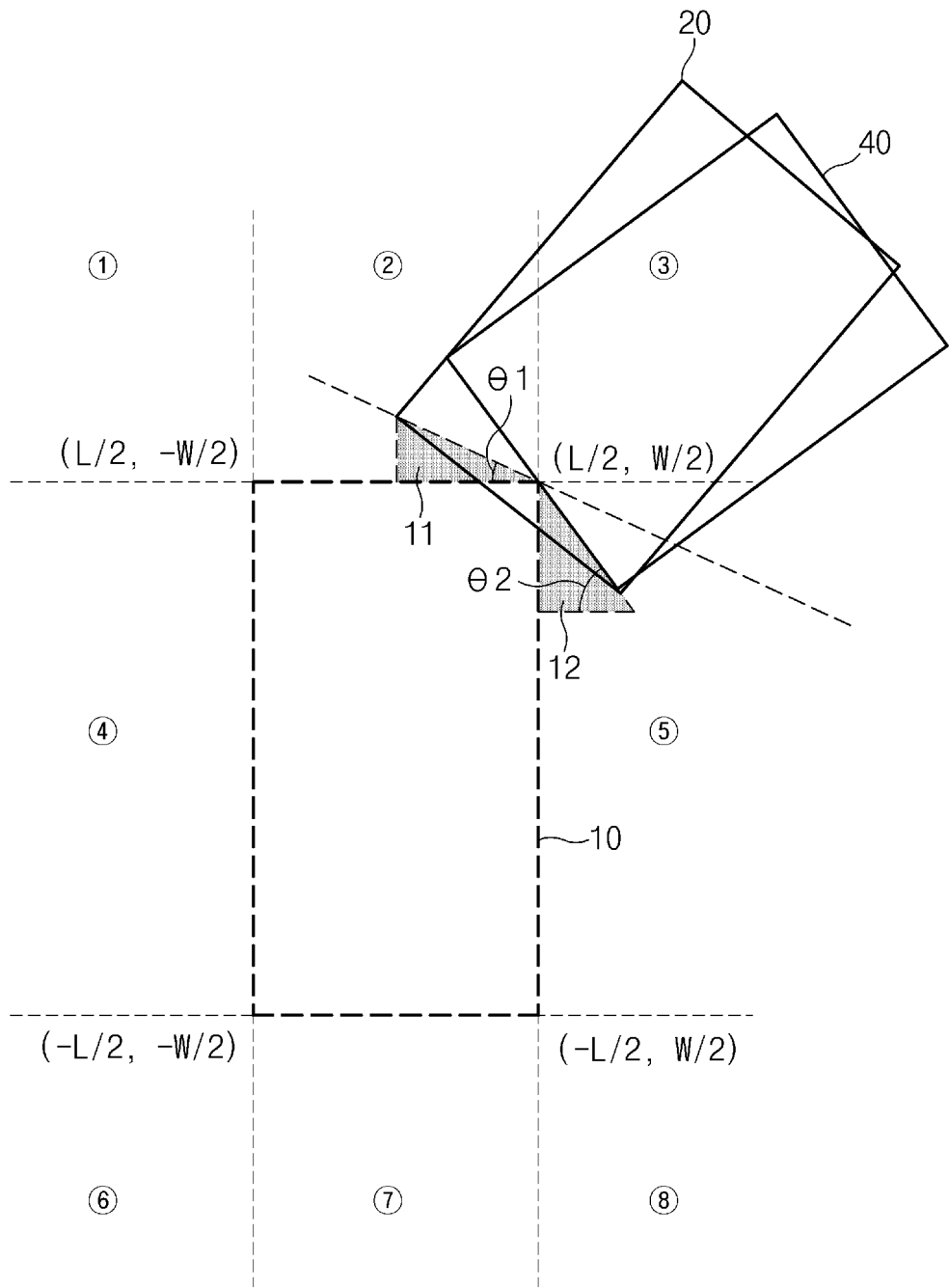

Thus, the processor 140 may calculate a tan value for angles θ1, and θ2 formed by the reference track 10 using the coordinates of the vertices of the target track 20 in FIG. 8D like Equation 3 below to calculate a length of the height/base, using the coordinates of the four vertices of each of the reference track 10 and the target track 20, which are previously calculated.

In other words, the processor 140 may know the height and base of each of triangles 11 and 12 using the coordinates of the vertices of the target track 20 and may calculate tan □ by applying a length of the height and base like Equation 3 below.

$$\tan \Theta = \text{Length of height/Length of base} \quad \text{[Equation 3]}$$

The processor 140 may calculate tan θ1 of the triangle 11 of region ② and tan θ2 of the triangle 12 of region ⑤ and may compare tan θ1 with tan θ2. In other words, when the tan θ1 of the triangle 11 of region ② is less than tan θ2 of the triangle 12 of region ⑤, the reference track 10 and the target track 20 may be overlapped with each other.

When the target box is located like reference numeral 40, that is, when tan θ1 of the triangle 11 of region ② is greater than or equal to tan θ2 of the triangle 12 of region ⑤, vertices of the reference track 10 are not present in the target track 40 and thus the reference track 10 and the target track 20 are not overlapped with each other.

Thus, the processor 140 may determine whether the reference track 10 is overlapped with the target track 20 in the same method in all the directions of four vertices of the reference track 10.

As such, when it is determined whether the reference track 10 and the target track 20 are overlapped with each other, the processor 140 may select a track box for fusion depending on reliability of each of the reference track 10 and the target track 20. The processor 140 may calculate reliability of the reference track 10 and reliability of the target track 20 using reliability of each of sensors, which provide information to generate the reference track 10 and the target track 20, and a time when the reference track 10 and the target track 20 are generated.

In this case, when the reliability of the reference track 10 and the reliability of the target track 20 have a difference of a predetermined value or more, the processor 140 may fuse track information using a track box with high reliability and may delete a track box which is not selected for fusion, or may control to fuse track information and output the fused track information via an interface 130 of FIG. 2.

When the reliability of the reference track 10 and the reliability of the target track 20 have a difference of less than the predetermined reference value, the processor 140 may select a track box, a generation time of which is old. Furthermore, when the reliability of the reference track 10 and the reliability of the target track 20 have a difference of less than the predetermined reference value, that is, when the difference between the reliability of the reference track 10 and the reliability of the target track 20 is low, the processor 140 may select a track box using various conditions, such as a combination of tracks by sensors, a host vehicle reference distance, and a location of the track, other than a time when the track box is generated. As an example, when the difference between the reliability of the reference track 10 and the reliability of the target track 20 is low, the processor 140 may select a track with many sensors which provide information about each track box between the reference track 10 and the target track 20, may select a track close to the host vehicle with respect to the host vehicle, or may select a track included in the line on which the host vehicle is traveling.

As such, the processor 140 may select a track to be deleted using reliability of each of the reference track 10 and the target track 20 and a time when the reference track 10 and the target track 20 are generated and may fuse information of the reference track 10 and the target track 20 by assigning a higher weight to information of a track having high reliability on the basis of the reliability of each of the reference track 10 and the target track 20 and a time when the reference track 10 and the target track 20 are generated.

The processor 140 may calculate reliability of each track using reliability of each sensor, which is received from each sensor, and an age when the track is generated, like Equation 4 below.

Reliability of reference track(max 100)=α(Reliability of sensor A)+Reliability of sensor B)+r(Generation time of reference track)

Reliability of target track=α(Reliability of sensor A)+β(Reliability of sensor B)+r(Generation time of target track) [Equation 4]

Like Equation 5 below, when a difference value between the reliability of the reference track 10 and the reliability of the target track 20 is greater than a predetermined reference value f, the processor 140 may select and fuse a track with high reliability. When the difference value between the reliability of the reference track 10 and the reliability of the target track 20 is less than the predetermined reference value f, the processor 140 may select and fuse a track, a generation time of which is old.

(reliability of reference track−Reliability of target track)>f% ➔ Select track with high reliability (reliability of reference track−Reliability of target track)<f% ➔ Select track, generation time of which is old [Equation 5]

Herein, Equations 4 and 5 are described as being one example for selecting a track for fusion, but not limited thereto. The processor 140 may select a track to be fused using various methods.

The processor 140 may control to delete and output a track, which has low reliability because of being determined as being overlapped, from the result of the sensor fusion output.

The sensor device 200 may include one or more sensors which detect an obstacle, for example, a preceding vehicle, located around the vehicle and measure a distance from the obstacle and/or a relative speed of the obstacle.

The sensing device 200 may have a plurality of sensors for sensing objects outside the vehicle and may obtain information about a location of the object, a speed of the object, a movement direction of the object, and/or a type (e.g., a vehicle, a pedestrian, a bicycle, a motorcycle, or the like) of the object. To this end, the sensing device 200 may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like.

The sensor information fusion device 100 according to an embodiment of the present disclosure, which has the above-mentioned configuration, is applicable to an advanced driving assistant system (ADAS).

A description will be given in detail of a sensor information fusion method according to an embodiment of the present disclosure with reference to FIGS. 9 and 10. FIG. 9 is a flowchart illustrating a sensor information fusion method according to an embodiment of the present disclosure. FIG. 10 is a flowchart illustrating in detail a method for determining whether a reference track and a target track are overlapped with each other according to an embodiment of the present disclosure.

Hereinafter, it is assumed that an autonomous controller 100 of FIG. 2 performs a process of FIGS. 9 and 10. Furthermore, in a description of FIGS. 9 and 10, an operation described as being performed by an apparatus may be understood as being controlled by a processor 140 of the sensor information fusion device 100.

Referring to FIG. 9, in S100, the apparatus may calculate midpoints of a reference track 10 and a target track 20 based on information received from each sensor.

In S200, the apparatus may convert the midpoint of the reference track 10 into the origin (0, 0) and may calculate coordinates of vertices of the reference track 10 based on length information and width information.

In S300, the apparatus may calculate a location (midpoint) of the target track 20 based on a relative distance based on the converted midpoint (0, 0) of the reference track 10 and coordinates of each vertex.

In S400, the apparatus may determine whether the midpoint of the target track 20 is located in a merge gate 30. When the midpoint of the target track 20 is located in the merge gate 30, in S500, the apparatus may calculate coordinates of each vertex of the target track 20.

In S600, the apparatus may determine whether the target track 20 and the reference track 10 are overlapped with each other. In this case, the apparatus may determine whether one of the coordinates of the vertices of the target track 20 is present in the reference track 10 (a box-in point) or may determine whether coordinates of the vertices of the target track 20 are present in a region outside the reference track 10 (a box crossed point), thus determining whether the reference track 10 and the target track 20 are overlapped with each other.

When it is determined that the reference track 10 and the target track 20 are overlapped with each other, in S700, the apparatus may perform fusion on the basis of a track with high reliability or a track, a generation time of which is old, based on reliability of each of the reference track 10 and the target track 20.

In S800, the apparatus may delete the track, fused because of being determined as being overlapped, from the result of the sensor fusion output.

Hereinafter, a description will be given in detail of the process (S600) of determining whether the reference track 10 and the target track 20 are overlapped with each other with reference to FIG. 10.

Referring to FIG. 10, in S601, the apparatus may apply a box-in point function. In S602 (in point), the apparatus may determine whether at least one vertex of the target track 20 is located in the reference track 10.

When the at least one vertex of the target track 20 is located in the reference track 10, the apparatus may determine that the reference track 10 and the target track 20 are overlapped with each other. When the at least one vertex of the target track is not located in the reference track 10, in S603, the apparatus may apply a box crossed function. When the at least one vertex of the target track 20 is not located in the reference track 10, but is located in a region outside the reference track 10, in S604 (Cross), the apparatus may determine that the reference track 10 and the target track 20 are overlapped with each other. The apparatus may determine whether the reference track and the target track cross.

As such, an embodiment of the present disclosure may simply and accurately determine whether two tracks are overlapped with each other when determining whether one target information by a sensor is overlapped and may accurately determine whether two tracks are overlapped with each other although track directions between sensors differ from each other.

Furthermore, an embodiment of the present disclosure may accurately determine whether two tracks are overlapped with each other irrespective of a heading angle of each of the two tracks and may determine whether tracks, determination of which is easy, are overlapped with each other in advance because of determining whether two tracks are overlapped with each other in an order where a determination method is easy, thus reducing an unnecessary process.

Furthermore, an embodiment of the present disclosure may determine an overlapped level in most of general situations using a resource similar to a logic which may correspond to only an existing special situation to perform fusion and may apply a software logic to improve sensor fusion performance without increasing an additional material cost.

FIG. 11 is a block diagram illustrating a computing system according to an embodiment of the present disclosure.

Referring to FIG. 11, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

When one object is detected as several overlapped tracks by a plurality of sensors, the present technology may simply and accurately determine whether the several tracks are overlapped with each other to fuse the tracks.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A sensor information fusion device, comprising:
 a processor configured to:
  when an object is detected by overlapping a plurality of track boxes through a plurality of sensors,
  generate a first track box in which the object is detected by a first sensor among the plurality of sensors, and generate a second track box in which the object is detected by a second sensor among the plurality of sensors; and
  determine whether the first track box and the second track box are overlapped with each other; and
 a storage configured to store data obtained by the processor and to store a set of instructions that when executed by the processor, implement an algorithm,
 wherein the processor is further configured to execute the set of instructions stored in the storage and to:
 generate a merge gate expanded from the first track box; and
 determine that the first track box and the second track box are overlapped with each other when the second track box is included in the merge gate.

2. The sensor information fusion device of claim 1, wherein the processor is further configured to:
 calculate midpoints of the first track box and the second track box based on information received from the plurality of sensors.

3. The sensor information fusion device of claim 2, wherein the processor is further configured to:
 convert the midpoint of the first track box into an origin; and
 calculate coordinates of vertices of the first track box based on length information and width information of the first track box.

4. The sensor information fusion device of claim 3, wherein the processor is further configured to:
 convert the midpoint of the second track box as relative coordinates for the origin of the first track box by applying the midpoint of the first track box and the midpoint of the second track box to a rotation transformation formula.

5. The sensor information fusion device of claim 3, wherein the processor is further configured to:
 calculate coordinates of vertices of the second track box using the midpoint, length information, width information, and a heading value of the second track box.

6. The sensor information fusion device of claim 1, wherein the processor is further configured to:
 determine a size of the merge gate based on length information and width information of the first track box.

7. The sensor information fusion device of claim 1, wherein the processor is further configured to:
 determine whether the first track box and the second track box overlap with each other based on a box-in point function; and
 determine whether the first track box and the second track box overlap with each other by applying a box crossed function to targets which are not determined by the box-in point function.

8. The sensor information fusion device of claim 1, wherein the processor is further configured to:

determine that the first track box and the second track box overlap with each other when at least one of coordinates of vertices of the second track box is located in the first track box.

9. The sensor information fusion device of claim 1, wherein the processor is further configured to:
divide a region outside the first track box into a plurality of regions when all of coordinates of vertices of the second track box are not located in the first track box; and
determine whether the first track box and the second track box overlap with each other based on a location of the coordinates when the coordinates of the vertices of the second track box are located in the plurality of regions.

10. The sensor information fusion device of claim 9, wherein the processor is further configured to:
sequentially divide and define a region above the first track box as a first region, a second region, and a third region;
define a region to left of the first track box as a fourth region;
define a region to right of the first track box as a fifth region; and
sequentially divide and define a region below the first track box as a sixth region, a seventh region, and an eighth region.

11. The sensor information fusion device of claim 10, wherein the processor is further configured to:
determine that the first track box and the second track box overlap with each other when at least one of the coordinates of the vertices of the second track box is present in the second region and the seventh region or is present in the fourth region and the fifth region.

12. The sensor information fusion device of claim 10, wherein the processor is further configured to:
form a first triangle by a line extended after a first vertex of the second track box is connected with a first vertex of the first track box, a perpendicular line drawn from the first vertex of the second track box to the first track box, and a portion of a first surface of the first track box; and
form a second triangle by a line extended after a second vertex of the second track box is connected with the first vertex of the first track box, a perpendicular line drawn from the second vertex of the second track box to the first track box, and a portion of a second surface of the first track box, when at least one of the coordinates of the vertices of the second track box is not present in the second region and the seventh region and is not present in the fourth region and the fifth region.

13. The sensor information fusion device of claim 12, wherein the processor is further configured to:
calculate a tangent value of the first triangle and a tangent value of the second triangle; and
compare the tangent value of the first triangle with the tangent value of the second triangle.

14. The sensor information fusion device of claim 13, wherein the processor is further configured to:
determine that the first track box and the second track overlap with each other when the tangent value of the first triangle is less than the tangent value of the second triangle.

15. The sensor information fusion device of claim 1, wherein the processor is further configured to:
select a track box for fusion depending on reliability of the first track box and reliability of the second track box.

16. The sensor information fusion device of claim 15, wherein the processor is further configured to:
perform fusion using a track box with higher reliability when the reliability of the first track box and the reliability of the second track box have a difference value equal to or greater than a predetermined reference value.

17. The sensor information fusion device of claim 15, wherein the processor is further configured to:
select a track box having an old generation time when the reliability of the first track box and the reliability of the second track box have a difference value less than a predetermined reference value.

18. The sensor information fusion device of claim 15, wherein the processor is further configured to:
calculate the reliability of the first track box and the reliability of the second track box using reliability of each of sensors; and generate the first track box and the second track box and a time when the first track box and the second track box are generated.

19. The sensor information fusion device of claim 15, wherein the processor is further configured to:
delete a track box which is not selected for fusion.

20. A sensor information fusion method, comprising:
when an object is detected by overlapping a plurality of track boxes through a plurality of sensors,
generating a first track box in which the object is detected by a first sensor among the plurality of sensors, and a second track box in which the object is detected by a second sensor among the plurality of sensors;
generating a merge gate expanded from the first track box; and
determining that the first track box and the second track box are overlapped with each other when the second track box is included in the merge gate.

* * * * *